(12) United States Patent
Lai et al.

(10) Patent No.: US 8,587,872 B2
(45) Date of Patent: Nov. 19, 2013

(54) LENS MODULE

(75) Inventors: Ching-Lung Lai, Hsinchu (TW);
Yen-Te Lee, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 126 days.

(21) Appl. No.: 13/188,860

(22) Filed: Jul. 22, 2011

(65) Prior Publication Data

US 2012/0050892 A1    Mar. 1, 2012

(30) Foreign Application Priority Data

Aug. 30, 2010 (TW) .................... 99129031 A (51) Int. Cl.
*G02B 9/00* (2006.01)
*G02B 9/64* (2006.01)
*G02B 9/62* (2006.01)

(52) U.S. Cl.
USPC .................... 359/649; 359/755; 359/761

(58) Field of Classification Search
USPC ......... 359/749–752, 754–756, 761, 763, 770, 359/784–788, 649–650
See application file for complete search history.

(56) References Cited

U.S. PATENT DOCUMENTS

| | | | | |
|---|---|---|---|---|
| 3,958,865 A * | 5/1976 | Sakai | | 359/750 |
| 4,136,931 A * | 1/1979 | Glatzel | | 359/749 |
| 5,600,490 A | 2/1997 | Sugawara et al. | | |
| 5,886,835 A * | 3/1999 | Suzuki et al. | | 359/782 |
| 6,169,636 B1 | 1/2001 | Kreitzer | | |
| 6,195,209 B1 * | 2/2001 | Kreitzer et al. | | 359/649 |
| 6,674,582 B2 | 1/2004 | Kawasaki | | |
| RE39,424 E * | 12/2006 | Moskovich | | 359/663 |
| 7,583,441 B2 * | 9/2009 | Taki | | 359/557 |
| 7,859,763 B2 * | 12/2010 | Lu et al. | | 359/649 |

FOREIGN PATENT DOCUMENTS

| | | |
|---|---|---|
| JP | 262321 | 10/1996 |
| TW | 444134 | 7/2001 |

* cited by examiner

*Primary Examiner* — Jordan Schwartz
(74) *Attorney, Agent, or Firm* — Muncy, Geissler, Olds & Lowe, PLLC (57) ABSTRACT

A lens module includes a first lens group with a positive refractive power, a second lens group with a negative refractive power, and a third lens group with a positive refractive power. The first lens group essentially consists of a first lens with a negative refractive power, a second lens with a positive refractive power and a third lens with a positive refractive power arranged in order from a magnified side to a reduced side. The second lens group essentially consists of a fourth lens with a negative refractive power and a fifth lens with a positive refractive power arranged in order from the magnified side to the reduced side. The third lens group essentially consists of a sixth lens with a positive refractive power and a seventh lens with a positive refractive power arranged in order from the magnified side to the reduced side.

17 Claims, 5 Drawing Sheets

LENS MODULE

BACKGROUND OF THE INVENTION a. Field of the Invention

The invention relates to an optical lens, and more particularly to an image lens used in a projection system and an image pick-up system.

b. Description of the Related Art

Typically, a high quality lens module may have low distortion aberration, high definition, high contrast ratio, and high luminance uniformity. Moreover, except for high image quality, a large field of view (FOV) is often needed for a projection system to project a large image in a limited space or for an image pick-up system to capture a wide-angle image. However, a large filed of view is liable to heighten distortion aberration. Further, in order to enhance light utilization efficiency and luminance uniformity, a main light beam near the reduced side of a lens module preferably propagates in a direction substantially parallel to the optical axis of the lens module. That is, a telecentric angle formed between the main light ray near the reduced side and the optical axis is set as small as possible. However, these requirements often conflict with each other to complicate the design of a lens module. For example, in order to reduce distortion aberration, the field of view of a lens module is limited, and a considerable number of lenses are needed. In comparison, in case a lens module is designed to allow a comparatively large field of view and allow a main light beam near a reduced side to propagate in a direction substantially parallel to the optical axis of the lens module, the entire length of the lens module and the size of lenses inevitably become larger to fail to provide a miniaturized lens module.

U.S. Pat. No. 6,674,582 discloses a microscope zoom objective lens system including a first lens group with a positive refractive power, a second lens group with a negative refractive power, and a third lens group with a positive refractive power. U.S. Pat. No. 5,600,490 discloses a zoom lens including, in order from the screen side, a first lens unit of positive refractive power, a second lens unit of negative refractive power, and a third lens unit of positive refractive power. Moreover, U.S. Pat. No. 7,342,723 discloses a wide angle projection lens including, in order from the screen side, a first lens group of negative refractive power, a second lens group of negative refractive power, and a third lens group of positive refractive power.

In view of the above, a lens of comparatively large refractive power is often needed to reduce the size and number of lenses in a lens module and to realize a telecentric lens module. However, such lens module may correspondingly have high aberration to deteriorate image quality. Further, in order to meet all the requirements of high image quality, low distortion aberration, high definition, high contrast ratio and high luminance uniformity, a considerable number (no less than 9 pieces) of spherical glass lenses are needed to increase the size and entire length of a lens module. Therefore, it is difficult to reduce fabrication costs and miniaturize the lens module.

BRIEF SUMMARY OF THE INVENTION

The invention provides a lens module having reduced length and number of lenses to decrease the entire size and fabrication costs. The invention also provides a lens module having high image quality, low distortion aberration, high definition, high contrast ratio and high luminance uniformity.

Other advantages and objects of the invention may be further comprehended through the technical features disclosed in the invention. In order to achieve one or part of or all the objectives or other objectives, a lens module according to an embodiment of the invention includes a first lens group, a second lens group and a third lens group. The first lens group has a positive refractive power and essentially consists of a first lens with a negative refractive power, a second lens with a positive refractive power and a third lens with a positive refractive power arranged in order from a magnified side to a reduced side. The second lens group is disposed between the first lens group and the reduced side. The second lens group has a negative refractive power and essentially consists of a fourth lens with a negative refractive power and a fifth lens with a positive refractive power arranged in order from the magnified side to the reduced side. The third lens group is disposed between the second lens group and the reduced side. The third lens group has a positive refractive power and essentially consists of a sixth lens with a positive refractive power and a seventh lens with a positive refractive power arranged in order from the magnified side to the reduced side.

According to another embodiment of this invention, a lens module includes a first lens group, a second lens group and a third lens group. The first lens group has a positive refractive power and essentially consists of a first lens with a negative refractive power, a second lens with a positive refractive power and a third lens with a positive refractive power arranged in order from a magnified side to a reduced side. The second lens group is disposed between the first lens group and the reduced side, and the second lens group includes a fourth lens with a negative refractive power. The third lens group is disposed between the second lens group and the reduced side, and the third lens group has a positive refractive power and essentially consists of a fifth lens with a positive refractive power and a sixth lens with a positive refractive power arranged in order from the magnified side to the reduced side.

In one embodiment, the lens module further includes an aperture stop disposed between the first lens group and the second lens group. The first lens group, the aperture stop and the second lens group are moved together to function as a focusing lens group, and the third lens group is fixed.

In one embodiment, the lens module satisfies the condition: $0.2 < f_{SG2}/f < 0.5$, where the first lens forms a first sub lens group of the first lens group, the second lens together with the third lens form a second sub lens group of the first lens group, $f_{SG2}$ denotes an effective focal length of the second sub lens group, and f denotes an effective focal length of the lens module.

In one embodiment, the lens module satisfies the condition: $0.6 < |f_{G2}|/f < 1.5$, where $f_{G2}$ denotes an effective focal length of the second lens group and f denotes an effective focal length of the lens module.

In one embodiment, the lens module satisfies the condition: $20 < (v_3 - v_4) < 37$, where $v_3$ denotes the Abbe number of the third lens and $v_4$ denotes the Abbe number of the fourth lens.

In one embodiment, the lens module satisfies the condition: $0.4 < L_{G2\text{-}G3}/f < 1$, where $L_{G2\text{-}G3}$ denotes a distance from the center of a lens surface of the second lens group immediately adjacent to the reduced side to the center of a lens surface of the third lens group immediately adjacent to the magnified side, and f denotes an effective focal length of the lens module.

In one embodiment, the lens module satisfies the condition: $0.6 < f_{G3}/f < 2$, where $f_{G3}$ denotes an effective focal length of the third lens group and f denotes an effective length of the lens module.

The embodiments of the invention have at least one of the following advantages:
(1) low lateral chromatic aberration;
(2) low distortion aberration;
(3) wide field of view;
(4) low telecentric angle (less than 3.1 degrees); and
(5) only six or seven lenses are needed to correct image aberration.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
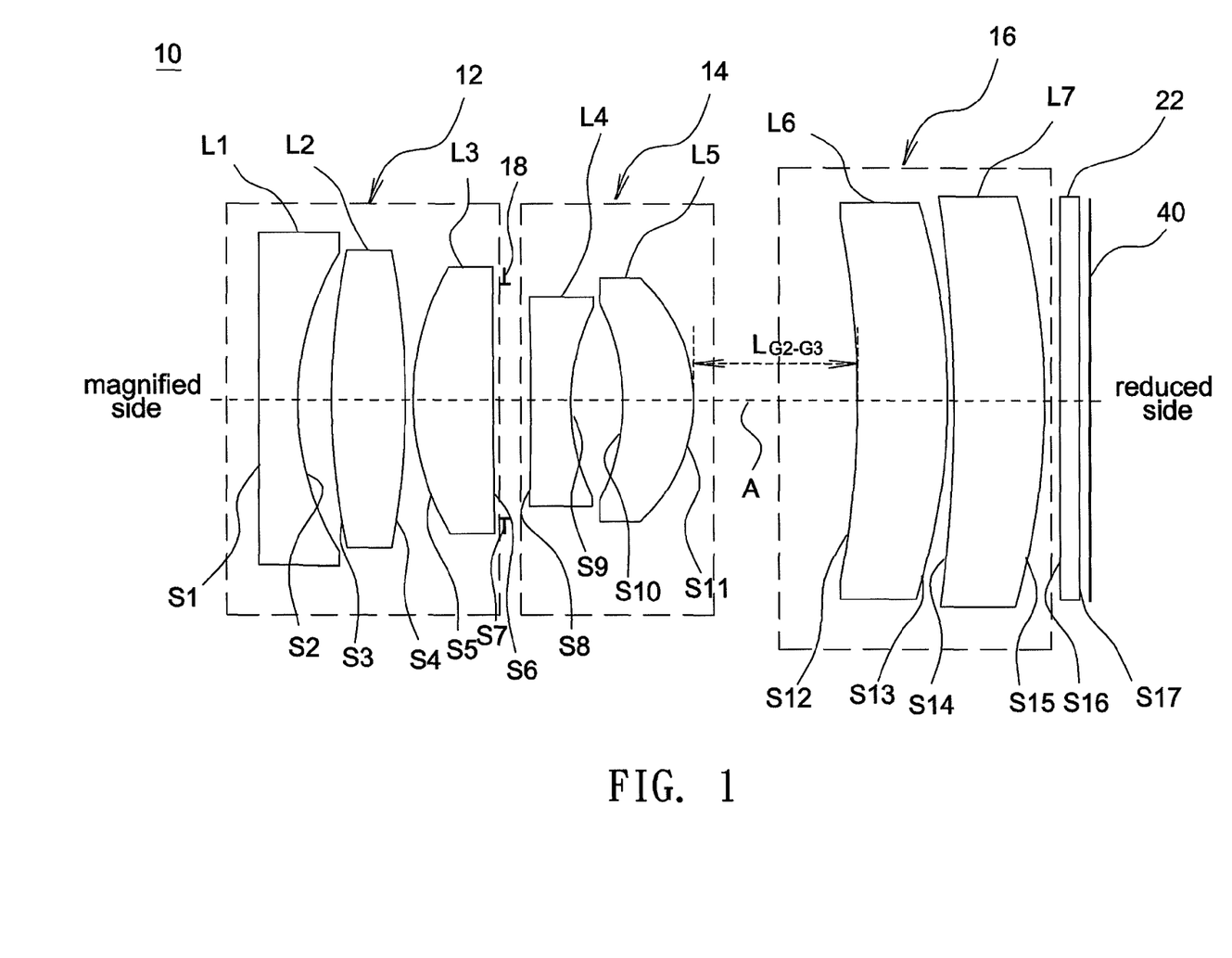
FIG. 1 shows a schematic diagram of a lens module according to an embodiment of the invention.

As shown in FIG. 1, a lens module 10 is disposed between a magnified side and a reduced side. Generally, an image processing device 40 may be disposed at the reduced side. For example, the image processing device 40 may be a photo-sensing device such as a charge-coupled device (CCD) image sensor or a complementary metal-oxide semiconductor (CMOS) image sensor. Alternatively, the image processing device 40 may be a light valve such as a digital micro-mirror device (DMD), a liquid-crystal-on-silicon panel (LCOS panel) or a transmissive liquid crystal panel (transmissive LCD panel). Referring to FIG. 1, the lens module 10 includes a first lens group 12 with a positive refractive power, a second lens group 14 with a negative refractive power, and a third lens group 16 with a positive refractive power. The first lens group 12 is disposed near the magnified side, the third lens group 16 is disposed near the reduced side, and the second lens group 14 is disposed between the first lens group 12 and the third lens group 16. Specifically, the first lens group 12 includes a first lens L1, a second lens L2 and a third lens L3 arranged in order from the magnified side to the reduced side. The first lens L1 has a negative refractive power, the second lens L2 has a positive refractive power, and the third lens L3 has a positive refractive power. The second lens group 14 includes a fourth lens L4 and a fifth lens L5 arranged in order from the magnified side to the reduced side. The fourth lens L4 has a negative refractive power, and the fifth lens L5 has a positive refractive power. The third lens group 16 includes a sixth lens L6 and a seventh lens L7 arranged in order from the magnified side to the reduced side. The sixth lens L6 has a positive refractive power, and the seventh lens L7 has a positive refractive power. In this embodiment, the first lens L1 has a concave surface facing the reduced side, the second lens L2 has a convex surface facing the reduced side, the third lens L3 has a convex surface facing the magnified side, the fourth lens L4 has a concave surface facing the reduced side, the fifth lens L5 has a convex surface facing the reduced side, the sixth lens L6 has a convex surface facing the reduced side, and the seventh lens L7 has a convex surface facing the reduced side. Further, the lens module 10 further includes an aperture stop 18 disposed between the first lens group 12 and the second lens group 14. The first lens group 12, the aperture stop 18, and the second lens group 14 are moved together to function as a focusing lens group, and the third lens group 16 is fixed. In this embodiment, the lens module 10 includes at least one aspheric lens to reduce the total number of lenses in the lens module 10. For example, a conventional lens module having an effective focal length of 10 mm needs 8 or 9 pieces of lenses. In comparison, a lens module having at least one aspheric lens needs only 6 or 7 pieces of lenses to reduce the entire length of a lens module. Besides, an aspheric lens may be made of plastic material to reduce fabrication costs. Further, in this embodiment, in order to realize a wide-angle lens module, the first lens L1 is designed to have a negative refractive power, and each of the second lens L2 and the third lens L3 is designed to have a comparatively large positive refractive power to correct aberration caused by the negative refractive power of the first lens L1. In addition, the third lens group 16 has two lenses with positive refractive powers (sixth lens L6 and seventh lens L7) to eliminate distortion and achieve a telecentric lens module.

A design example of the lens module 10 in FIG. 1 is described in detail below. Note the parameters listed in Tables 1 and 2 are only for exemplified purposes but do not limit the invention. It should be appreciated that variations about the design parameters or setting may be made in the embodiments by persons skilled in the art without departing from the scope of the invention.

TABLE 1

| Surface | radius of curvature (mm) | interval (mm) | refractive index | Abbe number |
|---|---|---|---|---|
| S1 | −341.635843 | 0.750000 | 1.707979 | 50.2746 |
| S2 | 5.664991 | 0.576041 | | |
| S3 | 17.346865 | 1.335434 | 1.89303 | 31.3339 |
| S4 | −15.284495 | 0.154126 | | |
| S5 | 4.492318 | 1.469950 | 1.882997 | 40.7651 |
| S6 | −90.177079 | 0.028946 | | |
| S7(aperture stop) | Infinity | 0.384792 | | |
| S8 | −39.098123 | 0.750000 | 1.92286 | 18.8969 |
| S9 | 4.040811 | 0.990438 | | |
| S10 | −4.852605 | 1.236205 | 1.826774 | 43.6074 |
| S11 | −3.308809 | 5.657070 | | |
| S12 | −19.854730 | 1.683904 | 1.834 | 37.2 |
| S13 | −11.665049 | 0.100000 | | |
| S14 | −27.739016 | 1.714693 | 1.834 | 37.2 |
| S15 | −13.000000 | 0.100000 | | |
| S16 | Infinity | 0.400000 | 1.508469 | 61.1878 |
| S17 | Infinity | 0.306000 | | |
| IMA | Infinity | 0 | | |

In Table 1, an interval is defined as a linear distance between two lens surfaces along the optical axis A. For example, an interval in relation to the surface S1 indicates a linear distance between the surface S1 and the surface S2 along the optical axis A. Besides, surfaces S1 and S2 are two opposite surfaces of the first lens L1, surfaces S3 and S4 are two opposite surfaces of the second lens L2, surfaces S5 and S6 are two opposite surfaces of the third lens L3, surface S7 indicates the aperture stop 18, and surfaces S8 and S9 are two opposite surfaces of the fourth lens L4. Moreover, surfaces S10 and S11 are two opposite surfaces of the fifth lens L5, surfaces S12 and S13 are two opposite surfaces of the sixth lens L6, surfaces S14 and S15 are two opposite surfaces of the seventh lens L7, and surfaces S16 and S17 are two opposite surfaces of a cover glass 22 of the image processing device 40. In addition, according to an embodiment of the invention, each of the surfaces S10 and S11 of the fifth lens L5 (aspheric lens) is an aspherical surface that satisfies the following equation:

$$Z(h) = \frac{h^2 r}{1 + \sqrt{1 - (1+k)h^2 r^2}} + C_2 h^2 + C_4 h^4 + C_6 h^6 + C_8 h^8 + C_{10} h^{10} + C_{12} h^{12},$$

where z denotes a sag along the optical axis A, h denotes an aspheric height (a vertical height from the optical axis A to an edge of the lens), r denotes the radius of curvature of a lens approaching the optical axis A, k denotes a conic constant, and $C_2$ to $C_{12}$ denote aspheric coefficients. The values of the aspheric coefficients and conic constant of each of the surfaces S10 and S11 are listed in Table 2.

TABLE 2

| | S10 | S11 |
|---|---|---|
| K | 0 | 0 |
| C2 = | 0 | 0 |
| C4 = | −7.65E−03 | −2.21E−03 |
| C6 = | 1.33E−03 | 3.84E−04 |
| C8 = | −1.77E−03 | −3.74E−04 |
| C10 = | 5.49E−04 | 7.85E−05 |
| C12 = | −8.38E−05 | −8.65E−06 |

Figure 2:
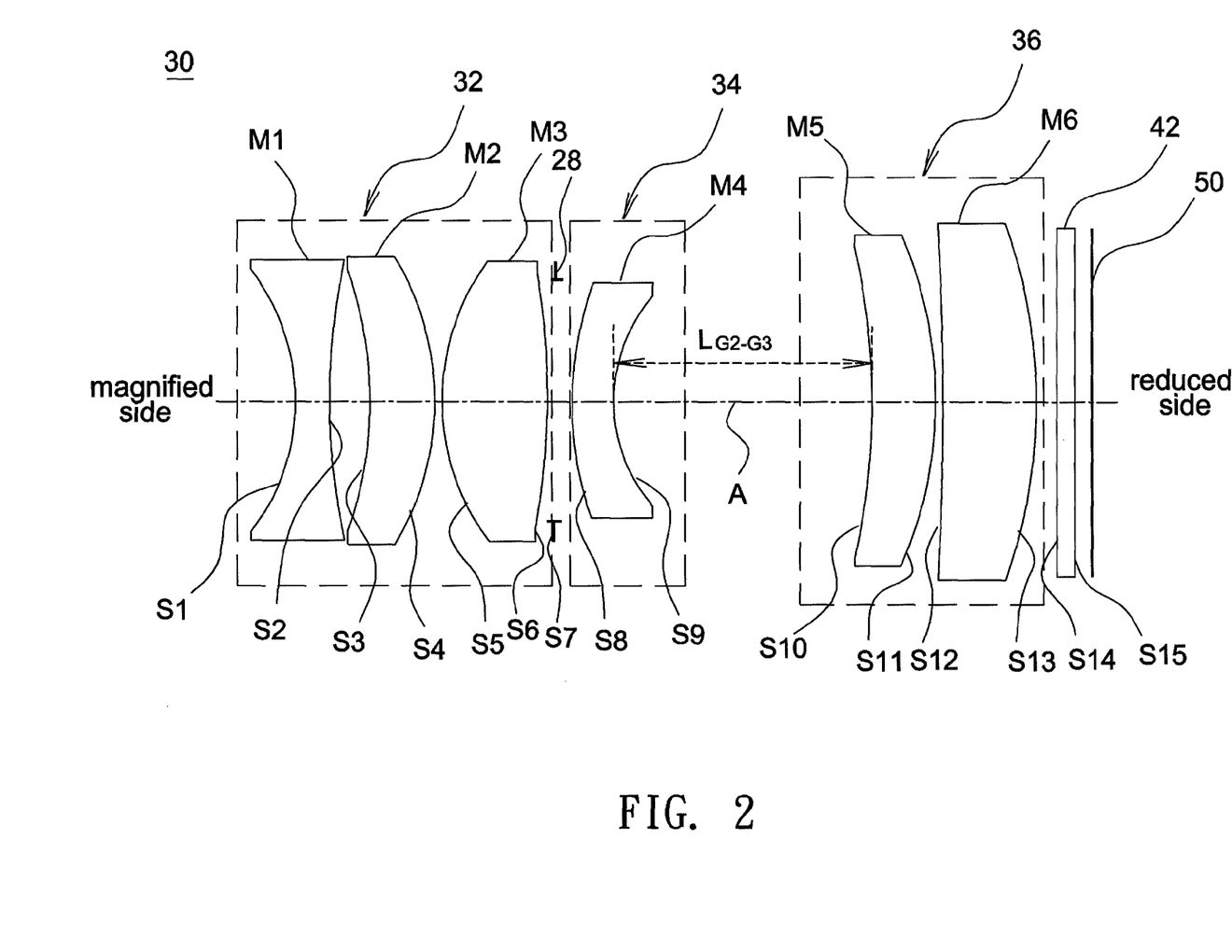
FIG. 2 shows a schematic diagram of a lens module according to another embodiment of the invention.

Referring to FIG. 2, a lens module 30 according to another embodiment of the invention includes a first lens group 32 with a positive refractive power, a second lens group 34 with a negative refractive power, and a third lens group 36 with a positive refractive power. The first lens group 32 is disposed near the magnified side, the third lens group 36 is disposed near the reduced side, and the second lens group 34 is disposed between the first lens group 32 and the third lens group 36. An image processing device 50 is disposed at the reduced side, and an aperture stop 28 is disposed between the first lens group 32 and the second lens group 34. This embodiment is different from the embodiment shown in FIG. 1 in that the second lens group 34 includes only one lens M4. The refractive powers of the first lens M1, the second lens M2, the third lens M3, the fourth lens M4, the fifth lens M5, and the sixth lens M6 arranged in order from the magnified side to the reduced side are negative, positive, positive, negative, positive, and positive, respectively. Similarly, in order to realize a wide-angle lens module, the first lens M1 is designed to have a negative refractive power, and the surface of the first lens M1 facing the magnified side is a concave surface to reduce the size of the first lens M1. Further, since the concave surface of the first lens M1 may cause negative distortion, the surface S11 of the fifth lens M5 is designed to have an aspherical shape to correct the negative distortion. Similarly, each of the second lens M2 and the third lens M3 is designed to have a comparatively large positive refractive power to correct aberration caused by the negative refractive power of the first lens M1. In addition, each of the fifth lens M5 and the sixth lens M6 of the third lens group 36 has a positive refractive power to correct distortion and realize a telecentric lens module.

A design example of the lens module 30 in FIG. 2 is described in detail below. Note the parameters listed in Tables 3 and 4 are only for exemplified purposes but do not limit the invention. It should be appreciated that variations about the design parameters or setting may be made in the embodiments by persons skilled in the art without departing from the scope of the invention.

TABLE 3

| Surface | radius of curvature (mm) | interval (mm) | refractive index | Abbe number |
|---|---|---|---|---|
| S1 | −4.689353 | 0.75 | 1.531717 | 48.84072 |
| S2 | 15.429133 | 0.828995 | | |
| S3 | −5.684862 | 1.470203 | 1.809979 | 40.94819 |
| S4 | −4.381142 | 0.1 | | |
| S5 | 4.061052 | 2.238399 | 1.6779 | 54.88744 |
| S6 | −26.623482 | −0.184656 | | |
| S7 (aperture stop) | Infinity | 0.319376 | | |
| S8 | 7.235668 | 0.915041 | 1.92286 | 18.89691 |
| S9 | 3.338229 | 7.655171 | | |
| S10 | −20.000000 | 1.404481 | 1.53116 | 56.04383 |
| S11 | −6.011043 | 0.1 | | |
| S12 | −50.000000 | 2 | 1.799516 | 42.22501 |
| S13 | −11.153957 | 0.1 | | |
| S14 | Infinity | 0.4 | 1.508469 | 61.1878 |
| S15 | Infinity | 0.306000 | | |
| IMA | Infinity | | | |

In Table 3, an interval is defined as a linear distance between two lens surfaces along the optical axis A. For example, an interval in relation to the surface S1 indicates a linear distance between the surface S1 and the surface S2 along the optical axis A. Besides, surfaces S1 and S2 are two opposite surfaces of the first lens M1, surfaces S3 and S4 are two opposite surfaces of the second lens M2, surfaces S5 and S6 are two opposite surfaces of the third lens M3, surface S7 indicates the aperture stop 18, surfaces S8 and S9 are two opposite surfaces of the fourth lens M4, surfaces S10 and S11 are two opposite surfaces of the fifth lens M5, surfaces S12 and S13 are two opposite surfaces of the sixth lens M6, and surfaces S14 and S15 are two opposite surfaces of a cover glass 42 of the image processing device 50. In addition, according to an embodiment of the invention, each of the surfaces S3, S4, S5, S6, S10, and S11 of the second lens M2, the third lens M3 and the fifth lens M5 (lens M2, M3 and M5 are aspheric lens) is an aspherical surface that satisfies the following equation:

$$Z(h) = \frac{h^2 r}{1+\sqrt{1-(1+k)h^2 r^2}} + C_2 h^2 + C_4 h^4 + C_6 h^6 + C_8 h^8 + C_{10} h^{10} + C_{12} h^{12},$$

where z denotes a sag along the optical axis A, h denotes an aspheric height (a vertical height from the optical axis A to an edge of the lens), r denotes the radius of curvature of a lens approaching the optical axis A, k denotes a conic constant, and $C_2$ to $C_{12}$ denote aspheric coefficients. The values of the aspheric coefficients and the conic constant of each of the surfaces S3, S4, S5, S6, S10 and S11 are listed in Table 4.

TABLE 4

|  | S3 | S4 | S5 | S6 | S10 | S11 |
|---|---|---|---|---|---|---|
| K | 0 | 0 | 0 | 0 | 19.015831 | −9.757112 |
| C2 = | 0 | 0 | 0 | 0 | 0 | 0 |
| C4 = | 5.03E−03 | 1.88E−03 | −3.44E−03 | −2.79E−03 | −4.87E−04 | −6.74E−04 |
| C6 = | −5.61E−04 | −7.85E−05 | −3.99E−05 | 1.41E−04 | −4.16E−05 | −1.84E−05 |
| C8 = | 8.61E−05 | 3.64E−05 | 1.21E−05 | 3.85E−06 | 6.38E−07 | 3.15E−07 |
| C10 = | −2.19E−06 | −2.35E−06 | −2.10E−06 | −1.29E−06 | 3.32E−07 | 3.27E−08 |
| C12 = | −3.62E−08 | 1.74E−07 | 9.21E−08 | 8.79E−08 | −4.22E−09 | 4.92E−09 |

In one embodiment, in order to achieve better image quality, a lens module may satisfy the condition: $0.2<f_{SG2}/f<0.5$, where the first lens forms a first sub lens group of the first lens group, the second lens together with the third lens form a second sub lens group of the first lens group, $f_{SG2}$ denotes an effective focal length of the second sub lens group, and f denotes an effective focal length of the lens module. Note that the aberration like spherical aberration and coma aberration are heightened as the value of ($f_{SG2}/f$) is less than 0.2. In comparison, in case the value of ($f_{SG2}/f$) is larger than 0.5, the aberration caused by the first sub lens group is insufficiently corrected, and a comparatively small refractive power of the second sub lens group may increase the entire length of a lens module.

In one embodiment, the lens module may satisfy the condition: $0.6<|f_{G2}|/f<1.5$, where $f_{G2}$ denotes an effective focal length of the second lens group and f denotes an effective focal length of the lens module. When the value of ($|f_{G2}|/f$) satisfies the above condition, off-axis aberration like field curvature and coma aberration is well corrected. In comparison, in case the value of ($|f_{G2}|/f$) is less than 0.6, the off-axis aberration is difficult to remedy even the size of the lens module is allowed to be reduced. On the other hand, in case the value of ($|f_{G2}|/f$) is larger than 1.5, the refractive power of the second lens group fails to sufficiently correct the aberration.

In one embodiment, the lens module may satisfy the condition: $20<(v_3-v_4)<37$, where $v_3$ denotes the Abbe number of the third lens and $v_4$ denotes the Abbe number of the fourth lens. In case the value of ($v_3-v_4$) is less than 20, the Abbe numbers of the third lens and the fourth lens are close to each other to fail to correct lateral chromatic aberration. On the other hand, in case the value of ($v_3-v_4$) is larger than 37, it would be difficult to correct longitudinal chromatic aberration.

In one embodiment, the lens module may satisfy the condition: $0.4<L_{G2-G3}/f<1$, where $L_{G2-G3}$ denotes a distance from the center of a lens surface of the second lens group immediately adjacent to the reduced side to the center of a lens surface of the third lens group immediately adjacent to the magnified side, and f denotes an effective focal length of the lens module. In case the value of ($L_{G2-G3}/f$) is less than 0.4, the distance between the second lens group and the third lens group is too small to accommodate elements of a projection system. On the other hand, in case the value of ($L_{G2-G3}/f$) is larger than 1, the refractive power of the second lens group fails to sufficiently correct the aberration causes by other lenses.

In one embodiment, in order to realize a telecentric lens module, all lenses of the third lens group have positive refractive powers and may satisfy the condition: $0.6<f_{G3}/f<2$, where $f_{G3}$ denotes an effective focal length of the third lens group and f denotes an effective length of the lens module. In case the value of ($f_{G3}/f$) is larger than 2, the refractive power of the third lens group is not large enough to form a telecentric lens module. On the other hand, in case the value of ($f_{G3}/f$) is less than 0.6, the refractive power of the third lens group is too large, and thus the distance $L_{G2-G3}$ between the second lens group and the third lens group is too small to accommodate elements of a projection system.

Accordingly, the embodiments of the invention may have at least one of the following advantages:
(1) low lateral chromatic aberration;
(2) low distortion aberration;
(3) wide field of view;
(4) low telecentric angle (less than 3.1 degrees); and
(5) only six or seven lenses are needed to correct image aberration.

Figure 3:
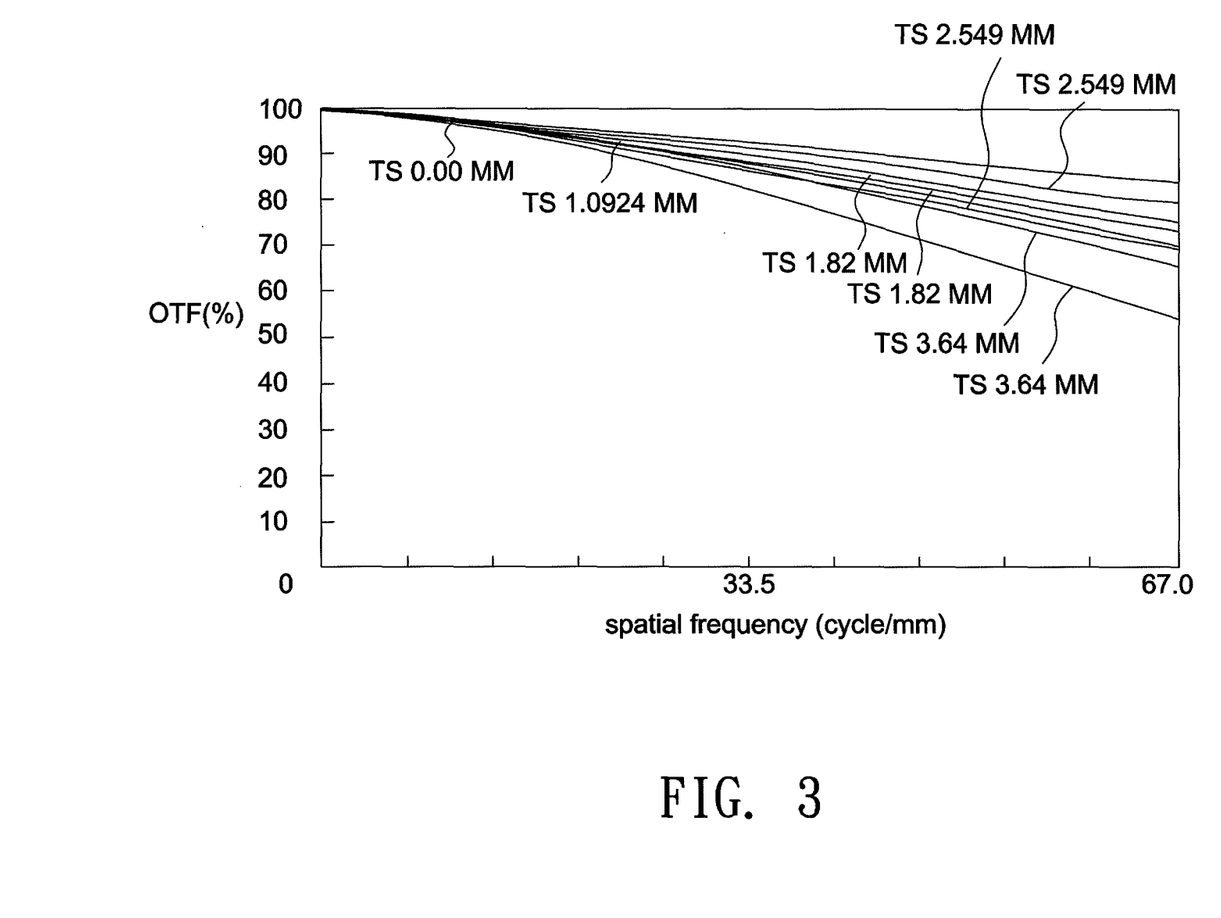
FIGS. 3 to 5 are diagrams showing optical simulation data of a lens module according to an embodiment of the invention.
Figure 4:
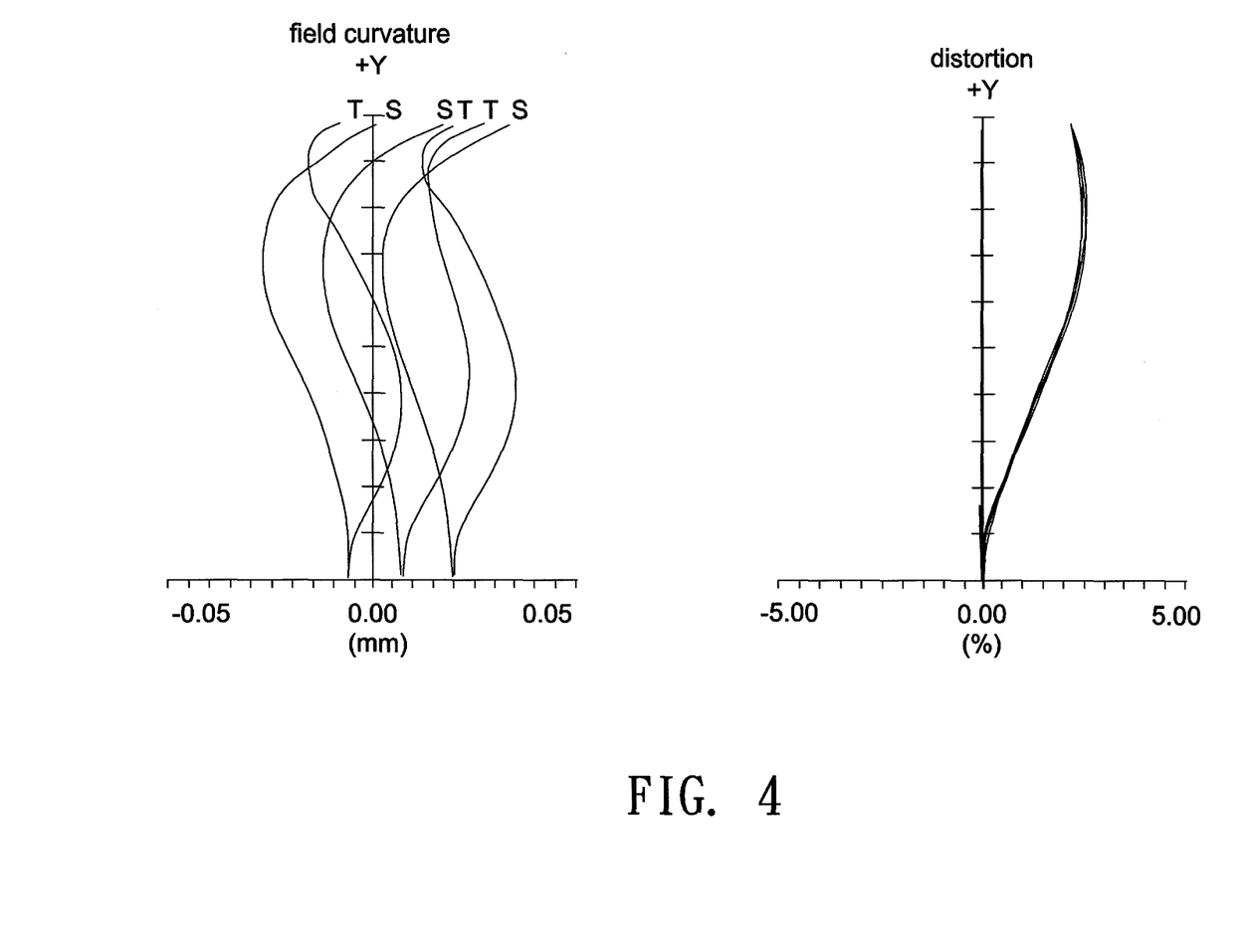
Figure 5:
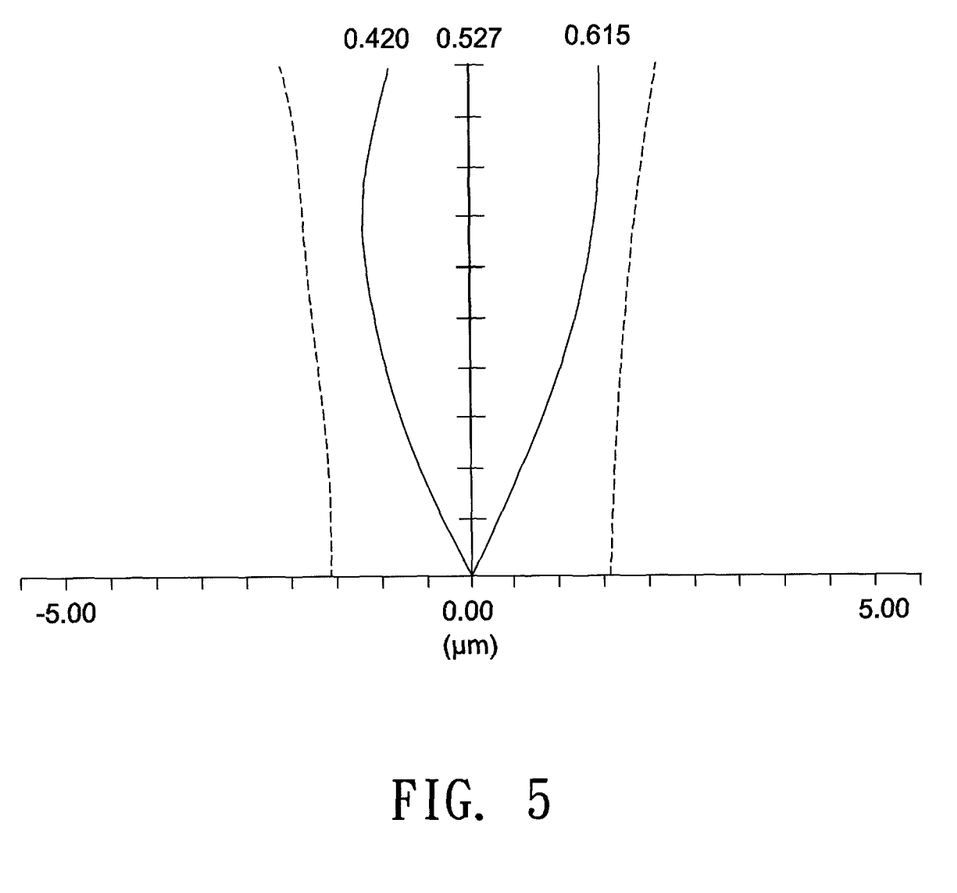

FIG. 3 shows a modulation transfer function (MTF) curve, where the abscissa represents the spatial frequency (in unit of cycle per millimeter) and the ordinate represents the modulus of the optical transfer function (OTF). FIG. 4 illustrates the field curvature and the distortion, where the abscissa for the field curvature curve represents the distance measured from a focal plane, the ordinate for the field curvature curve represents different fields (from 0 to the maximum), the abscissa for the distortion curve represents the percentage of distortion, and the ordinate for the distortion curve represents different fields (from 0 to the maximum). FIG. 5 illustrates lateral chromatic aberration curve. Since each of the graphics shown in FIG. 3 to FIG. 5 falls within a standard range, the lens module according to different embodiments of the invention may achieve good imaging quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Each of the terms "first", "second", and "third" is only a nomenclature used to modify its corresponding element. These terms are not used to set up the upper limit or lower limit of the number of elements, wherein the element is, for example, a lens group or a lens.

What is claimed is:

1. A lens module, comprising:
   a first lens group having a positive refractive power and essentially consisting of a first lens with a negative refractive power, a second lens with a positive refractive power and a third lens with a positive refractive power arranged in order from a magnified side to a reduced side;
   a second lens group disposed between the first lens group and the reduced side, the second lens group having a negative refractive power and essentially consisting of a fourth lens with a negative refractive power and a fifth lens with a positive refractive power arranged in order from the magnified side to the reduced side;
   a third lens group disposed between the second lens group and the reduced side, the third lens group having a positive refractive power and essentially consisting of a sixth lens with a positive refractive power and a seventh lens with a positive refractive power arranged in order from the magnified side to the reduced side; and
   an aperture stop disposed between the first lens group and the second lens group, wherein the first lens group, the aperture stop and the second lens group are moved together to function as a focusing lens group, and the third lens group is fixed.

2. The lens module as claimed in claim 1, wherein the fifth lens is an aspheric lens.

3. The lens module as claimed in claim 1, further comprising an image processing device disposed at the reduced side.

4. The lens module as claimed in claim 1, wherein the lens module satisfies a condition: $0.2<f_{SG2}/f<0.5$, where the first lens forms a first sub lens group of the first lens group, the second lens together with the third lens form a second sub lens group of the first lens group, $f_{SG2}$ denotes an effective focal length of the second sub lens group, and f denotes an effective focal length of the lens module.

5. The lens module as claimed in claim 1, wherein the lens module satisfies a condition: $0.6<|f_{G2}|/f<1.5$, where $f_{G2}$ denotes an effective focal length of the second lens group and f denotes an effective focal length of the lens module.

6. The lens module as claimed in claim 1, wherein the lens module satisfies a condition: $20<(v_3-v_4)<37$, where $v_3$ denotes the Abbe number of the third lens and $v_4$ denotes the Abbe number of the fourth lens.

7. The lens module as claimed in claim 1, wherein the lens module satisfies a condition: $0.4<L_{G2-G3}/f<1$, where $L_{G2-G3}$ denotes a distance from a center of a lens surface of the second lens group immediately adjacent to the reduced side to a center of a lens surface of the third lens group immediately adjacent to the magnified side, and f denotes an effective focal length of the lens module.

8. The lens module as claimed in claim 1, wherein the lens module satisfies a condition: $0.6<f_{G3}/f<2$, where $f_{G3}$ denotes an effective focal length of the third lens group and f denotes an effective length of the lens module.

9. A lens module, comprising:
   a first lens group having a positive refractive power and essentially consisting of a first lens with a negative refractive power, a second lens with a positive refractive power and a third lens with a positive refractive power arranged in order from a magnified side to a reduced side;
   a second lens group disposed between the first lens group and the reduced side, and the second lens group comprising a fourth lens with a negative refractive power;
   a third lens group disposed between the second lens group and the reduced side, the third lens group having a positive refractive power and essentially consisting of a fifth lens with a positive refractive power and a sixth lens with a positive refractive power arranged in order from the magnified side to the reduced side; and
   an aperture stop disposed between the first lens group and the second lens group, wherein the first lens group, the aperture stop and the second lens group are moved together to function as a focusing lens group, and the third lens group is fixed.

10. The lens module as claimed in claim 9, wherein a surface of the first lens facing the magnified side is a concave surface.

11. The lens module as claimed in claim 9, wherein at least one of the second lens, the third lens and the fifth lens is an aspheric lens.

12. The lens module as claimed in claim 9, further comprising an image processing device disposed at the reduced side.

13. The lens module as claimed in claim 9, wherein the lens module satisfies the condition: $0.2<f_{SG2}/f<0.5$, where the first lens forms a first sub lens group of the first lens group, the second lens together with the third lens form a second sub lens group of the first lens group, $f_{SG2}$ denotes an effective focal length of the second sub lens group, and f denotes an effective focal length of the lens module.

14. The lens module as claimed in claim 9, wherein the lens module satisfies a condition: $0.6<|f_{G2}|/f<1.5$, where $f_{G2}$ denotes an effective focal length of the second lens group and f denotes an effective focal length of the lens module.

15. The lens module as claimed in claim 9, wherein the lens module satisfies the condition: $20<(v_3-v_4)<37$, where $v_3$ denotes the Abbe number of the third lens and $v_4$ denotes the Abbe number of the fourth lens.

16. The lens module as claimed in claim 9, wherein the lens module satisfies a condition: $0.4<L_{G2-G3}/f<1$, where $L_{G2-G3}$ denotes a distance from a center of a lens surface of the second lens group immediately adjacent to the reduced side to a center of a lens surface of the third lens group immediately adjacent to the magnified side, and f denotes an effective focal length of the lens module.

17. The lens module as claimed in claim 9, wherein the lens module satisfies a condition: $0.6<f_{G3}/f<2$, where $f_{G3}$ denotes an effective focal length of the third lens group and f denotes an effective length of the lens module.

* * * * *